Sept. 22, 1936.   A. J. FAUSEK ET AL   2,054,971
APPARATUS FOR WELDING
Filed Feb. 23, 1932
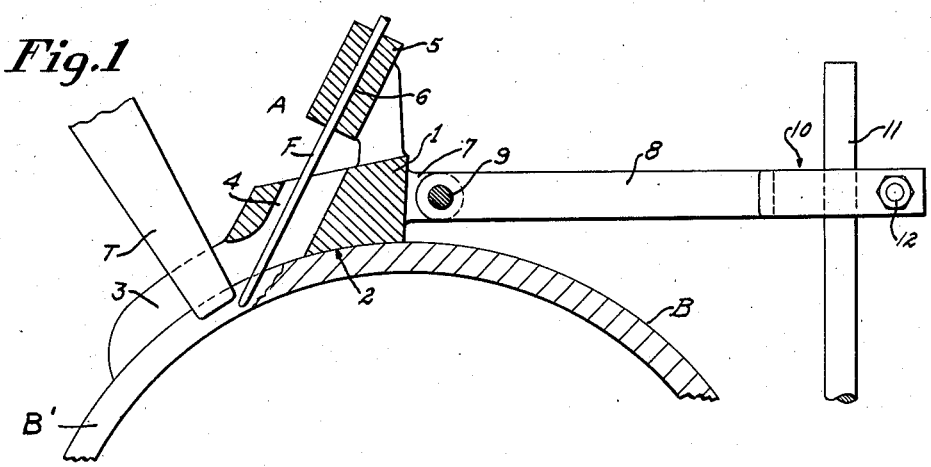
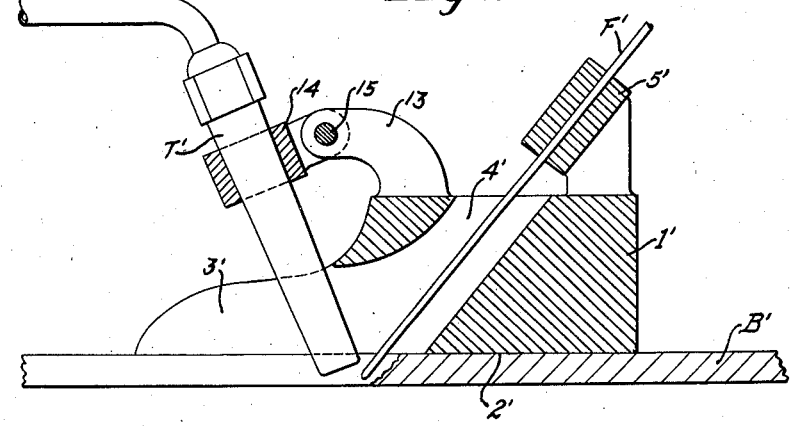
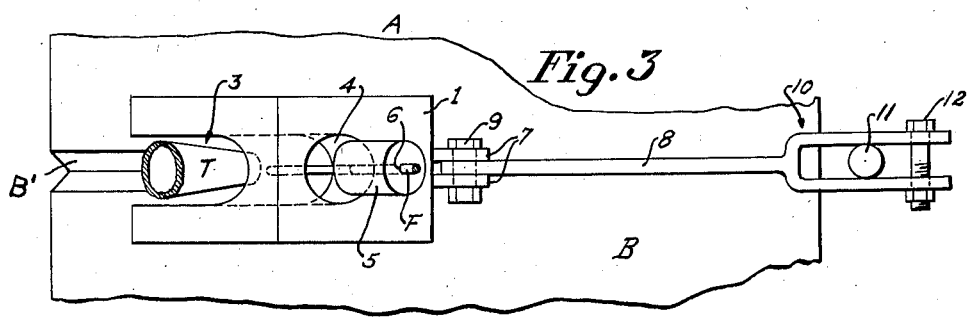
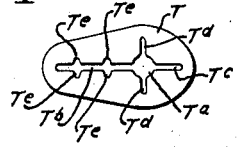
INVENTORS
A. J. FAUSEK
I. F. FAUSEK
BY E. M. Harrington
ATTORNEY Patented Sept. 22, 1936

2,054,971

UNITED STATES PATENT OFFICE 2,054,971

APPARATUS FOR WELDING

Arthur J. Fausek and Irwing F. Fausek, Clayton, Mo.

Application February 23, 1932, Serial No. 594,510

5 Claims. (Cl. 113—111)

This invention relates generally to apparatus for welding and more specifically to an improved apparatus in the use of which welding operations which involve the joining of meeting or overlapping edges of work may be performed in a simple, convenient and expeditious manner, the predominant object of the invention being to provide a greatly simplified apparatus of the class described which will perform welding operations of the sort referred to in an improved manner.

In the welding art there has been a strong desire for some time to simplify welding operations so that certain types of welding operations might be more rapidly performed and without the necessity that the persons performing the operations be highly skilled. In following out our improved method and in the use of our improved apparatus the welding operations are simplified to such extent that the degree of skill necessary in performing the operations is greatly reduced, and the speed at which said operations may be performed is very greatly increased.

Figure 1 is a fragmentary section showing my improved apparatus in use performing a welding operation on pipe sections or like elements.

Figure 2 is a view similar to Figure 1 but showing the apparatus slightly modified so as to be capable of use in performing welding operations on flat articles.

Figure 3 is a plan view of the apparatus and pipe sections illustrated in Figure 1.

Figure 4 is a detail showing the shape of the discharge orifice at the end of the tip of the torch employed in welding in accordance with this invention.

In the drawing, wherein are shown for the purpose of illustration, merely, two embodiments of the invention, and referring for the moment to Figures 1 and 3 of said drawing, A designates our improved apparatus as it may be constructed and arranged for use in welding pipes and like elements. In Figure 1 B designates pipe sections which are being welded, and for the purpose of this disclosure it may be considered that the work involves welding together meeting edges of the pipe sections, B' designating the more or less V-shaped space between adjacent pipe sections at which the welding operation is being performed and which results from beveling the adjacent edges of the pipe sections being welded.

The improved apparatus as illustrated in Figures 1 and 3 includes a block 1 of such longitudinally curved shape as to be provided with a bottom face 2 of such curved arrangement that when the block 1 rests upon a pipe as illustrated in Figure 1 said curved bottom face 2 of the block will conform to the shape of the outer surface of the pipe and will contact throughout its entire area therewith. The block 1 may be made of any suitable material which is characterized by the ability to resist high heat, carbon, for instance, and is provided with a cutaway portion 3, said cutaway portion preferably being open at one end of the block and being embraced at the remainder of its margin by portions of the block 1. The block 1 is also provided with an opening 4 which communicates at its lower end with the cutaway portion 3 and at its upper end is open at the top face of the block, said opening 4 intermediate of its opposite open ends being entirely surrounded by portions of the block.

The block has associated therewith a suitable guiding element 5 for the filler rod F employed in performing the welding operations. This guiding element 5 may be in the form of an elongated member provided with an opening 6 formed therethrough through which the filler rod F is extended, said filler rod being extended downwardly from the guiding element to a point where its lower end is disposed at the point where the welding operation is being performed as shown in Figure 1. During the use of our apparatus the filler rod is moved longitudinally of the opening 6 in the guiding element so that its lower end is moved toward and from the point at which the welding operation is being performed, and insofar as this invention is concerned such movement may be imparted to the filler rod either manually or automatically as desired.

For the purpose of maintaining the block 1 in its proper position on the pipe B we preferably provide said block with a pair of ears 7 and pivotally disposed between said ears is an end portion of an arm 8, a bolt 9 constituting the means for pivoting the arm to the ears. At its opposite end the arm 8 is provided with a bifurcated portion 10 the opposed leg portions of which are possessed of sufficient resiliency to permit of movement thereof toward and from each other. The bifurcated portion 10 receives between the opposed leg portions thereof the upper portion of a rod 11 which may be driven into the ground, or otherwise maintained in a perpendicular position, and said bifurcated portion has associated therewith a bolt or equivalent device 12 which is operable to draw the leg portions of the bifurcated portion toward each other and thus clamp the arm 8 to said rod 11.

In Figures 1, 3, and 4 of the drawing the torch employed in performing the welding operations is designated by the reference character T. The discharge end portion of the tip of the torch is positioned in the cutaway portion 3 of the block 1 and as this cutaway portion is positioned immediately at the point where the welding operation is to be performed the flame at the discharge end of the torch will be directed toward the proper point on the pipe. The discharge orifice of the tip of the torch is of the unusual shape illustrated in Figure 4 of the drawing, said orifice comprising a substantially circular portion $T^a$, an elongated portion $T^b$ which communicates with and extends from said portion $T^a$, a shorter portion $T^c$ which communicates with and extends from the circular portion $T^a$ in the opposite direction from the portion $T^b$ and in substantial alinement therewith, transversely extended portions $T^d$ communicating with and extended in opposite directions from the portion $T^a$, and short transversely extended portions $T^e$ communicating with and extended outwardly in opposite directions from the portion $T^b$. It will be noted that all of the portions of the discharge orifice of the torch tip are in communication with each other so that a single irregularly shaped flame is produced.

In the operation of the apparatus illustrated in Figures 1 and 3 said apparatus is arranged on the pipe sections being welded together as shown in said views so that the point of junction between the adjacent pipe sections where the welding operation is to be performed extends longitudinally of the cutaway portion 3 of the block 1. The torch is lighted in the usual manner and the discharge portion of the tip of said torch is arranged in the cutaway portion 3 of the block 1 so as to direct the flame at the discharge end of the tip at the junction of the adjacent pipe sections being welded together. During the welding operation the pipe sections B are rotated slowly with respect to the block 1, either manually or with the aid of suitable mechanism, and during such slow rotation of the pipe sections the welding operation is performed. It is important to note that the shape of the orifice at the discharge end of the tip of the torch T as illustrated in Figure 4 plays an important part in the efficient and rapid performance of the welding operation. In this regard it will be noted that the portion $T^b$ of the orifice extends longitudinally of the joint between the pipe sections being welded together and serves to preheat the portion of said joint subject to the heat of the flame portion at the portion $T^b$ of the orifice as said portion of said joint moves toward the welding zone. Also the transverse portions $T^d$ and $T^e$ of the orifice serve to completely fill the more or less V-shaped notch at the junction of the pipe sections with a hot flame. Finally the portion $T^c$ of the orifice at the discharge end of the torch tip applies heat directly to the filler rod and thereby causes the material of said filler rod at the lower end thereof to flow. A feature of the invention which is of paramount importance is the arrangement of the opening 4 with respect to the cutaway portion 3. This cutaway portion serves to concentrate the heat produced by the flame at the discharge end of the torch tip at the precise point where the welding operation is being performed, hence, the maximum results are obtained from said heat. Also as the heat referred to leaves the zone where the welding operation is being performed it passes upwardly through the opening 4 and longitudinally of the filler rod F whereby said filler rod is preheated and is thus prepared for the welding operation.

In the form of the invention illustrated in Figure 2 the block 1' is provided with a flat bottom face 2' which contacts with the top faces of the flat sheets B' being welded together. The block 1' is provided with a cutaway portion 3' and a communicating opening 4', and a guiding element 5' associated with said block slidingly supports a filler rod F' so that its lower end is disposed at the point where the welding operation is to be performed. The block 1' of Figure 2 is provided with an extension 13 rigidly associated therewith to which an element 14, which embraces a portion of the torch T' is pivotally attached at 15.

In the use of the form of the invention illustrated in Figure 2 the person performing the welding operations will move the tip of the torch T' along the joint between the elements being welded together and because said torch and the block 1' are pivotally connected together said block will follow the torch. During such movement of the torch the filler rod F' may be manipulated toward and from the point where the welding operation is being performed and the torch is capable of slight pivotal movement with respect to the block L' because of the pivotal connection 15 between said parts. The tip of the torch T' of Figure 2 is provided with an orifice such as that illustrated in Figure 4, hence, the same improved results obtained in the use of the type of the invention shown in Figures 1 and 3 are realized in the use of the type of the invention illustrated in Figure 2. In other words, the flame at the discharge end of the tip of the torch preheats the portions of the joint being welded before said portions are subjected to the actual welding operations, while at the same time the lower end of the filler rod is subjected to direct heat of the flame and said flame completely fills the more or less V-shaped space at the junction between adjacent edges of the elements being welded together. Also the cutaway portion 3' concentrates the heat of the flame at the precise point where said heat is desired, and said heat escaping through the opening 4' preheats the filler rod.

From the foregoing it is plain that in the use of the two types of the invention illustrated and described herein the work of performing welding operations of the type referred to herein is very greatly simplified so that said work may be done with much greater speed by persons possessing less skill than was required heretofore.

Instead of attaching the torch T' to the block 1' as shown in Figure 2 said torch may be independent of the block and the block may be moved along the work by moving the filler rod F' so as to impart proper movement to the block.

We claim:

1. An apparatus for welding comprising a torch, an element adapted to rest upon the article being welded during the welding operation and provided with a partially enclosed cavity adapted to concentrate heat produced by said torch at the point where the welding operation is to be performed, and means for movably connecting said torch to said element.

2. An apparatus for welding comprising a torch, an element provided with a cavity adapted to concentrate heat produced by said torch at the point where the welding operation is to be performed, said element being provided with a passageway which communicates with said cavity and is adapted to receive a portion of a filler rod whereby heat passing from said cavity is caused to move through said passageway and pass in close proximity to said filler rod for preheating same, and means for movably connecting said torch to said element.

3. An apparatus for welding comprising an element provided with a partially enclosed cavity adapted to concentrate heat produced at the point where the welding operation is being performed, said element being adapted to rest upon the article being welded during the welding operation and being provided with a separate passageway which communicates with said cavity and is adapted to receive a portion of the filler rod whereby heat passing from said cavity is caused to move through said passageway and pass in close proximity to said filler rod for preheating the same.

4. An apparatus for welding comprising an element provided with a partially enclosed cavity adapted to concentrate heat produced at the point where the welding operation is being performed, means associated with said element for supporting a filler rod, said element being adapted to rest upon the article being welded during the welding operation and being provided with a separate passageway which communicates with said cavity and is adapted to receive a portion of a filler rod whereby heat passing from said cavity is caused to move through said passageway and pass in close proximity to said filler rod for preheating same.

5. An apparatus for welding comprising an element provided with a partially enclosed cavity adapted to concentrate heat produced at the point where the welding operation is being performed, means associated with said element and disposed immediately above same for supporting a filler rod, said element being adapted to rest upon the article being welded during the welding operation and being provided with a separate passageway which communicates with said cavity and is adapted to receive a portion of a filler rod whereby heat passing from said cavity is caused to move through said passageway and pass in close proximity to said filler rod for preheating same.

ARTHUR J. FAUSEK.
IRWING F. FAUSEK.